(12) United States Patent
Qiu et al.

(10) Patent No.: US 11,848,436 B2
(45) Date of Patent: Dec. 19, 2023

(54) METHOD AND APPARATUS OF FORMING ELECTRODE PLATE

(71) Applicant: CONTEMPORARY AMPEREX TECHNOLOGY CO., LIMITED, Ningde (CN)

(72) Inventors: Shaojun Qiu, Ningde (CN); Nengwu Liao, Ningde (CN); Chao Guo, Ningde (CN); Tiefeng Wu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/184,010

(22) Filed: Mar. 15, 2023

(65) Prior Publication Data

US 2023/0223506 A1 Jul. 13, 2023

Related U.S. Application Data

(63) Continuation of application No. PCT/CN2022/079762, filed on Mar. 8, 2022.

(30) Foreign Application Priority Data

Jun. 30, 2021 (CN) .......................... 202110742032.9

(51) Int. Cl.
*H01M 4/04* (2006.01)
*H01M 50/533* (2021.01)
(Continued)

(52) U.S. Cl.
CPC ................ *H01M 4/04* (2013.01); *B08B 5/04* (2013.01); *B23K 26/16* (2013.01); *B23K 26/38* (2013.01); *H01M 50/533* (2021.01)

(58) Field of Classification Search
CPC .......... B23K 26/38; B23K 26/16; B08B 5/04; H01M 50/533; H01M 4/04
(Continued)

(56) References Cited

U.S. PATENT DOCUMENTS 5,113,055 A * 5/1992 Kuriyama .......... B23K 26/1476
219/121.72
5,760,369 A * 6/1998 Wenkman .............. B23K 26/10
219/121.85
(Continued)

FOREIGN PATENT DOCUMENTS

CN 101442114 A 5/2009
CN 102427125 A 4/2012
(Continued)

OTHER PUBLICATIONS

International Search Report for Application No. PCT/CN2022/079762, dated Apr. 25, 2022.
(Continued)

*Primary Examiner* — Jimmy Chou
(74) *Attorney, Agent, or Firm* — Ladas & Parry LLP

(57) ABSTRACT

Disclosed is method and device for forming an electrode plate. The method includes: performing tab cutting on a substrate so that the substrate forms a body portion, an edge portion connecting to the body portion, and a plurality of tabs that connect to the body portion but are separated from the edge portion; and performing edge portion cutting on the substrate to separate the edge portion from the body portion. The electrode plate is formed in two steps. First, the tab and the edge portion are separated, so that in the process of cutting, impact of vibration of the edge portion on the tab is small, greatly reducing the risk of deformation of the tab caused by vibration of the edge portion and damage to the tab caused by being pulled by the edge portion. Second, edge
(Continued)

portion cutting separates the edge portion from the body portion.

6 Claims, 13 Drawing Sheets

(51) Int. Cl.
  *B08B 5/04* (2006.01)
  *B23K 26/16* (2006.01)
  *B23K 26/38* (2014.01)
(58) Field of Classification Search
  USPC .................................................. 219/121.72
  See application file for complete search history.

(56) References Cited

U.S. PATENT DOCUMENTS

| | | | | |
|---|---|---|---|---|
| 6,191,382 | B1* | 2/2001 | Damikolas | B23K 26/40 219/121.84 |
| 6,358,347 | B1* | 3/2002 | Thornton | B29C 53/50 156/203 |
| 8,334,071 | B2* | 12/2012 | Morishima | H01M 4/139 429/211 |
| 8,365,981 | B1* | 2/2013 | Perlsweig | B65D 5/48024 229/120.32 |
| 8,728,849 | B1* | 5/2014 | Mattos | H01L 31/0392 219/121.72 |
| 10,283,753 | B2* | 5/2019 | Chong | H01M 4/70 |
| 11,673,209 | B2* | 6/2023 | Umehara | H01M 50/46 219/121.72 |
| 2013/0126594 | A1* | 5/2013 | Gasior | B65D 5/443 229/198.2 |
| 2013/0252086 | A1* | 9/2013 | Stern | H01M 4/0402 29/623.5 |
| 2014/0053383 | A1* | 2/2014 | Holl | B23K 26/38 29/623.3 |
| 2014/0255778 | A1 | 9/2014 | Huh et al. | |
| 2015/0026970 | A1* | 1/2015 | Jung | H01M 10/0431 29/877 |
| 2015/0068945 | A1* | 3/2015 | Baker | B65D 5/0055 206/509 |
| 2015/0068946 | A1* | 3/2015 | Baker | B65D 5/427 206/509 |
| 2015/0090702 | A1* | 4/2015 | Ban | B23K 26/083 219/121.81 |
| 2015/0207129 | A1* | 7/2015 | Tsurumi | H01M 50/46 429/211 |
| 2015/0352667 | A1* | 12/2015 | Hemes | B23K 26/144 219/121.61 |
| 2016/0036009 | A1* | 2/2016 | Cho | B23K 26/244 219/121.72 |
| 2016/0263705 | A1* | 9/2016 | Kim | B23K 26/042 |
| 2017/0058389 | A1* | 3/2017 | Gayden | H01M 4/13 |
| 2017/0072512 | A1* | 3/2017 | Umehara | B23K 26/402 |
| 2019/0081345 | A1* | 3/2019 | Lee | H01M 4/0404 |
| 2019/0198853 | A1* | 6/2019 | Nishio | H01M 4/043 |
| 2019/0198860 | A1* | 6/2019 | Nishio | H01M 4/70 |
| 2019/0267606 | A1* | 8/2019 | Lee | H01M 4/0433 |
| 2019/0329353 | A1* | 10/2019 | Dai | B23K 26/0876 |
| 2020/0122273 | A1* | 4/2020 | Xu | H01M 4/0471 |
| 2020/0136191 | A1* | 4/2020 | Kojima | H01M 10/0585 |
| 2020/0223010 | A1* | 7/2020 | Umehara | H01M 4/0404 |
| 2020/0276670 | A1* | 9/2020 | Watanabe | B23K 26/08 |
| 2020/0343532 | A1* | 10/2020 | Aya | H01M 4/043 |
| 2020/0406401 | A1* | 12/2020 | Breuer | H01M 4/75 |
| 2021/0066687 | A1* | 3/2021 | Que | H01M 50/536 |
| 2021/0367232 | A1* | 11/2021 | Park | H01M 10/052 |

FOREIGN PATENT DOCUMENTS

| | | | | |
|---|---|---|---|---|
| CN | 202308205 | U | 7/2012 | |
| CN | 103730683 | A | 4/2014 | |
| CN | 106340608 | A | 1/2017 | |
| CN | 206022517 | U | 3/2017 | |
| CN | 207530041 | U | 6/2018 | |
| CN | 207743324 | U | 8/2018 | |
| CN | 108565387 | A | 9/2018 | |
| CN | 207952966 | U | 10/2018 | |
| CN | 109848583 | A | 6/2019 | |
| CN | 109894660 | A | 6/2019 | |
| CN | 110116277 | A * | 8/2019 | B23P 15/00 |
| CN | 110116277 | A | 8/2019 | |
| CN | 110556508 | A | 12/2019 | |
| CN | 111038800 | A | 4/2020 | |
| CN | 111403682 | A | 7/2020 | |
| CN | 111660015 | A | 9/2020 | |
| CN | 111760958 | A | 10/2020 | |
| CN | 110394557 | B | 5/2021 | |
| DE | 102017218495 | A1 | 4/2019 | |
| JP | 2001126708 | A | 5/2001 | |
| JP | 2012221913 | A | 11/2012 | |
| JP | 2013163213 | A | 8/2013 | |
| JP | 2015170568 | A | 9/2015 | |
| JP | 2016001575 | A | 1/2016 | |
| JP | 2017098210 | A | 6/2017 | |
| JP | 2017208293 | A | 11/2017 | |
| JP | 2018014222 | A | 1/2018 | |
| JP | 2018037309 | A | 3/2018 | |
| JP | 2018041625 | A | 3/2018 | |
| JP | 2021144824 | A | 9/2021 | |
| KR | 20160109384 | A | 9/2016 | |

OTHER PUBLICATIONS

Written Opinion for Application No. PCT/CN2022/079762, dated Apr. 25, 2022.
First Office Action of Korean Patent Application No. 10-2023-7004171, dated May 16, 2023.
Notification to grant patent right, CN application No. 202110742032.9, dated Apr. 13, 2023.
Notice of reasons for refusal, JP application No. 2023-508062, dated Jul. 20, 2023.
Request for the Submission of an Opinion, KR application No. 10-2023-7004171, dated Sep. 8, 2023.
Pang et al. Design of Controller Base on PC104 for Laser Tabs Shaping Machine, Modular Machine Tool & Automatic Manufacturing Technique, Jan. 2011 (with English Abstract), 4 pages.
Yang et al. Research on tab bending for laminated Lithium-ion battery, Chinese Battery Industry, Apr. 2018 (with English Abstract), 3 pages.
Guo Yandong, Automotive power battery pole piece cutting technology and equipment, Automobile manufacturing industry, Aug. 2012.

* cited by examiner

METHOD AND APPARATUS OF FORMING ELECTRODE PLATE

CROSS-REFERENCE TO RELATED APPLICATIONS

This application is a continuation of International Patent Application No. PCT/CN2022/079762, filed on Mar. 8, 2022, which claims priority to Chinese patent application No. 202110742032.9, filed on Jun. 30, 2021. The aforementioned patent applications are incorporated herein by reference in their entirety.

TECHNICAL FIELD

This application relates to the field of battery manufacturing technologies, and specifically, to a method and device for forming an electrode plate.

BACKGROUND

Lithium batteries have been widely applied in fields such as electronic products, vehicles, and aerospace. As application environments and conditions become increasingly complex, higher requirements are imposed on batteries being used in terms of their safety performance, energy density, production costs, and the like.

The forming quality of electrode plates of lithium-ion batteries has a great impact on the safety performance, energy density, and production costs of the batteries. Therefore, how the forming quality of electrode plates is increased has become an urgent issue to be resolved in the process of battery manufacturing.

SUMMARY

Embodiments of this application provide a method and device for forming an electrode plate to increase the forming quality of electrode plate.

According to a first aspect, an embodiment of this application provides a method for forming an electrode plate, where the electrode plate includes a body portion and tabs, the tabs protrude from the body portion at an edge of the body portion, and the method includes:
  performing tab cutting on a substrate so that the substrate forms the body portion, an edge portion connecting to the body portion, and a plurality of the tabs that connect to the body portion but are separated from the edge portion; and
  performing edge portion cutting on the substrate to separate the edge portion from the body portion.

In the foregoing technical solution, the electrode plate forming is implemented in two steps. In the first step, the tab and the edge portion are separated, so that in the processing of cutting, vibration of the edge portion has an extremely small impact on the tab, greatly reducing the risk of decrease in product pass rate that is resulting from deformation of the tab caused by vibration of the edge portion and damage to the tab caused by being pulled by the edge portion, and also increasing the forming quality of the electrode plate; and in the second step, after the edge portion and the tab are separated, the edge portion cutting is performed to separate the edge portion from the body portion so as to complete the electrode plate cutting.

In some embodiments of the first aspect of this application, the performing tab cutting on a substrate includes:
  performing cutting on the substrate multiple times, where a group of cutting lines that separate one of the tabs from the edge portion are formed on the substrate in each cutting.

In the foregoing technical solution, a group of cutting lines that separate one of the tabs from the edge portion are formed in each cutting, so that each tab can be separated from the edge portion, making every tab less affected by vibration of the edge portion, thereby reducing the risk of decrease in product pass rate that is resulting from deformation of the substrate at the tab caused by vibration of the edge portion and damage to the tab caused by being pulled by the edge portion, and thus increasing the pass rate and quality of the electrode plate.

In some embodiments of the first aspect of this application, the performing cutting on the substrate multiple times includes:
  performing cutting on the substrate multiple times in the process of transferring the substrate in a first direction, where a group of cutting lines that separate one of the tabs from the edge portion are formed on the substrate in each cutting.

In the foregoing technical solution, the performing cutting on the substrate multiple times in the process of transferring the substrate in a first direction means that substrate moving and tab cutting are performed simultaneously, which can raise the tab cutting efficiency.

In some embodiments of the first aspect of this application, the performing cutting on the substrate multiple times in the process of transferring the substrate in a first direction includes:
  in the process of transferring the substrate in the first direction, performing cutting on the substrate multiple times through reciprocation of a cutting apparatus in a second direction,
  where the first direction intersects the second direction.

In the foregoing technical solution, the first direction of transferring the substrate intersects the second direction of cutting the tab, which can form tabs of a specific contour and form tabs in a specific direction of the substrate, thereby meeting different production and use requirements. Performing tab cutting through reciprocation of the cutting apparatus in the second direction not only makes contours of the tabs uniform, but also raises the tab cutting efficiency. Performing cutting on the substrate multiple times in the process of transferring the substrate in the first direction means that substrate moving and the tab cutting are performed simultaneously, which can raise the tab cutting efficiency.

In some embodiments of the first aspect of this application, each group of cutting lines include a first cutting line and a second cutting line; and
  that a group of cutting lines that separate one of the tabs from the edge portion are formed on the substrate in each cutting includes:
  the substrate is cut along a first side edge of the tab from the position of a first root of the tab to a first position beyond a widthwise edge of the substrate to form the first cutting line; and
  the substrate is cut along a second side edge of the tab from a second position beyond a widthwise edge of the substrate to the position of a second root of the tab to form the second cutting line.

In the foregoing technical solution, the first cutting line separating the tab from the edge portion is formed by cutting along the first side edge of the tab from the position of the first root of the tab to the edge beyond a widthwise edge of the substrate, and the second cutting line separating the tab from the edge portion is formed by cutting along a second side edge of the tab from a second position beyond a widthwise edge of the substrate to the position of the second root of the tab. In this way, two discontinuous edge portions located on the first side edge and the second side edge respectively are formed by the first cutting line and the second cutting line, so as to adapt to different electrode plate forming processes.

In some embodiments of the first aspect of this application, each group of cutting lines include a third cutting line, a fourth cutting line, and a fifth cutting line, where the third cutting line and the fifth cutting line each are connected to two ends of the fourth cutting line; and that a group of cutting lines that separate one of the tabs from the edge portion are formed on the substrate in each cutting includes:

the substrate is cut along the first side edge of the tab from the first root of the tab to a top edge of the tab to form the third cutting line;

the substrate is cut along the top edge of the tab to form the fourth cutting line; and the substrate is cut along the second side edge of the tab from the top edge of the tab to the second root of the tab to form the fifth cutting line; where the third cutting line, the fourth cutting line, and the fifth cutting line together separate one of the tabs from the edge portion.

In the foregoing technical solution, the third cutting line separating the tab from the edge portion is formed by cutting along the first side edge of the tab from the first root of the tab to the top edge of the tab, the fourth cutting line separating the tab from the edge portion is formed by performing cutting on the substrate along the top edge of the tab, and the fifth cutting line separating the tab from the edge portion is formed by cutting along the second side edge of the tab from the top edge of the tab to the second root of the tab. In this way, the edge portions formed by the third cutting line, the fourth cutting line, and the fifth cutting line are continuous edge portions, so as to adapt to different electrode plate forming processes.

In some embodiments of the first aspect of this application, each two adjacent ones of the tabs have a first root and a second root that are adjacent to each other; and the performing edge portion cutting on the substrate to separate the edge portion from the body portion includes:

performing cutting on the substrate along a connection line between the first root and the second root that are adjacent to each other to separate the edge portion from the body portion.

In the foregoing technical solution, the edge portion and the body portion are separated along the connection line between the first root and the second root that are adjacent to each other, so that the contours of the body portion formed by cutting are regular, thereby increasing the forming quality of the electrode plate.

In some embodiments of the first aspect of this application, the method for forming an electrode plate further includes:

performing a first negative-pressure dust removal treatment when performing tab cutting on the substrate, and performing a second negative-pressure dust removal treatment when performing edge portion cutting on the substrate, where a negative pressure in the first negative-pressure dust removal treatment is less than or equal to a negative pressure in the second negative-pressure dust removal treatment.

In the foregoing technical solution, the negative-pressure dust removal treatment is performed both when performing tab cutting on the substrate and when performing edge portion cutting on the substrate, which can ensure the cleanness of electrode plate forming environments and reduce the impact of dust generated in the process of substrate cutting on the electrode plate. An amount of dust generated when performing tab cutting on the substrate is less than an amount of dust generated when performing edge portion cutting on the substrate. Therefore, the negative pressure for the first negative-pressure dust removal is smaller than the negative pressure for the second negative-pressure dust removal, which can not only meet the need of dust removal, but also help with energy saving and cost saving.

According to a second aspect, an embodiment of this application provides a device for forming an electrode plate, including:

a cutting apparatus, configured to perform tab cutting on a substrate so that the substrate forms a body portion, an edge portion connecting to the body portion, and a plurality of tabs that connect to the body portion but are separated from the edge portion, and configured to perform edge portion cutting on the substrate to separate the edge portion from the body portion.

In the foregoing technical solution, the cutting apparatus can perform cutting on the substrate in two steps. In the first step, tab cutting is performed on the substrate to separate the tab from the edge portion, so that in the process of cutting, vibration of the edge portion has an extremely small impact on the tab, greatly reducing the risk of decrease in product pass rate that is resulting from deformation of the substrate at the tab caused by vibration of the edge portion and damage to the tab caused by being pulled by the edge portion. In the second step, after the edge portion and the tab are separated, the cutting apparatus performs edge portion cutting on the substrate to separate the edge portion from the body portion. The electrode plate cutting is completed.

In some embodiments of the second aspect of this application, the cutting apparatus includes a first cutting apparatus and a second cutting apparatus.

The first cutting apparatus is configured to perform tab cutting on the substrate so that the substrate forms the body portion, the edge portion connecting to the body portion, and a plurality of the tabs that connect to the body portion but are separated from the edge portion.

The second cutting apparatus is configured to perform edge portion cutting on the substrate to separate the edge portion from the body portion.

In the foregoing technical solution, different cutting apparatuses are used to perform tab cutting on the substrate and perform edge portion cutting on the substrate respectively, so that the steps of tab cutting and the steps of edge portion cutting do not affect each other, which is conducive to forming high-quality electrode plates. In addition, the first cutting apparatus and the second cutting apparatus can be controlled independently, so that the operations of the device for forming an electrode plate are more flexible. The first cutting apparatus and the second cutting apparatus can be operated simultaneously. To be specific, in the process of the first cutting apparatus performing tab cutting on the substrate, the second cutting apparatus can separate the edge portion that has been separated from the tab from the body portion, thereby raising the production efficiency of the electrode plate.

In some embodiments of the second aspect of this application, the device for forming an electrode plate further includes a transfer apparatus, where the transfer apparatus is configured to transfer the substrate in a first direction.

In the foregoing technical solution, the transfer apparatus transfers the substrate so that the cutting apparatus can form tabs at different positions of the substrate, helping form an electrode plate with a plurality of tabs. In addition, the cutting apparatuses can also perform tab cutting on the substrate and edge portion cutting on the substrate in the process that the transfer apparatus transfers the substrate, which can raise the cutting efficiency and further raise the production efficiency of the electrode plate.

In some embodiments of the second aspect of this application, the second cutting apparatus is disposed downstream of the first cutting apparatus.

The first cutting apparatus is configured to perform tab cutting on the substrate when the transfer apparatus is transferring the substrate in the first direction.

The second cutting apparatus is configured to perform edge portion cutting on the substrate when the transfer apparatus is transferring the substrate in the first direction.

In the foregoing technical solution, the second cutting apparatus is disposed downstream of the first cutting apparatus so that the part of the substrate of which tab cutting has been completed can be transferred to the second cutting apparatus under the action of the transfer apparatus, and the second cutting apparatus performs edge portion cutting on this part. In this way, tab cutting on the substrate and edge portion cutting on the substrate can be performed continuously, the first cutting apparatus can continuously perform the tab cutting on the substrate, and the second cutting apparatus can continuously perform the edge portion cutting on the substrate, which can raise the cutting efficiency and further raise the production efficiency of the electrode plate.

In some embodiments of the second aspect of this application, at least one of the first cutting apparatus and the second cutting apparatus is a laser cutting apparatus.

In the foregoing technical solution, at least one of the first cutting apparatus and the second cutting apparatus is a laser cutting apparatus, where the laser cutting apparatus has advantages such as good cutting quality, high cutting precision, fast cutting speed, and low maintenance cost.

In some embodiments of the second aspect of this application, the device for forming an electrode plate further includes a dust collection apparatus, where the dust collection apparatus is configured to remove dust generated on the substrate when the cutting apparatuses are performing cutting on the substrate.

In the foregoing technical solution, when the cutting apparatuses are performing cutting on the substrate, the dust generated during cutting is removed by using the dust collection apparatus, which can ensure the cleanness of environments of forming electrode plate and reduce the impact of the dust generated in the process of substrate cutting on the electrode plates.

In some embodiments of the second aspect of this application, the dust collection apparatus includes a first dust collection apparatus and a second dust collection apparatus.

The first dust collection apparatus is configured to remove dust generated on the substrate when the first cutting apparatus is performing tab cutting on the substrate.

The second dust collection apparatus is configured to remove dust generated on the substrate when the second cutting apparatus is performing edge portion cutting on the substrate.

In the foregoing technical solution, the first cutting apparatus and the second cutting apparatus are provided with the first dust collection apparatus and the second dust collection apparatus respectively, making the dust removal effect better.

In some embodiments of the second aspect of this application, the first dust collection apparatus includes a first negative-pressure generating apparatus, the second dust collection apparatus includes a second negative-pressure generating apparatus, and a negative pressure in the operating of the second negative-pressure generating apparatus is greater than or equal to a negative pressure in the operating of the first negative-pressure generating apparatus.

In the foregoing technical solution, a concentration of dust in the air after the negative-pressure dust removal is low, which can effectively prevent or reduce the wear of the apparatuses. In addition, transferring under negative pressure is simple and easy to implement.

In some embodiments of the second aspect of this application, the device for forming an electrode plate further includes a waste guiding apparatus, where the waste guiding apparatus is configured to guide the edge portion to a waste collection area after the edge portion is separated from the body portion.

In the foregoing technical solution, the waste guiding apparatus can timely guide the waste from the edge portion to the waste collection area after the edge portion is separated from the body portion, thereby raising working efficiency.

BRIEF DESCRIPTION OF DRAWINGS

To describe the technical solutions in the embodiments of this application more clearly, the following briefly describes the accompanying drawings required for describing the embodiments. It is appreciated that the accompanying drawings below only show some embodiments of this application and thus should not be considered as limitations on the scope. A person of ordinary skill in the art may still derive other related drawings from the accompanying drawings without creative efforts.

REFERENCE SIGNS

Figure 1:
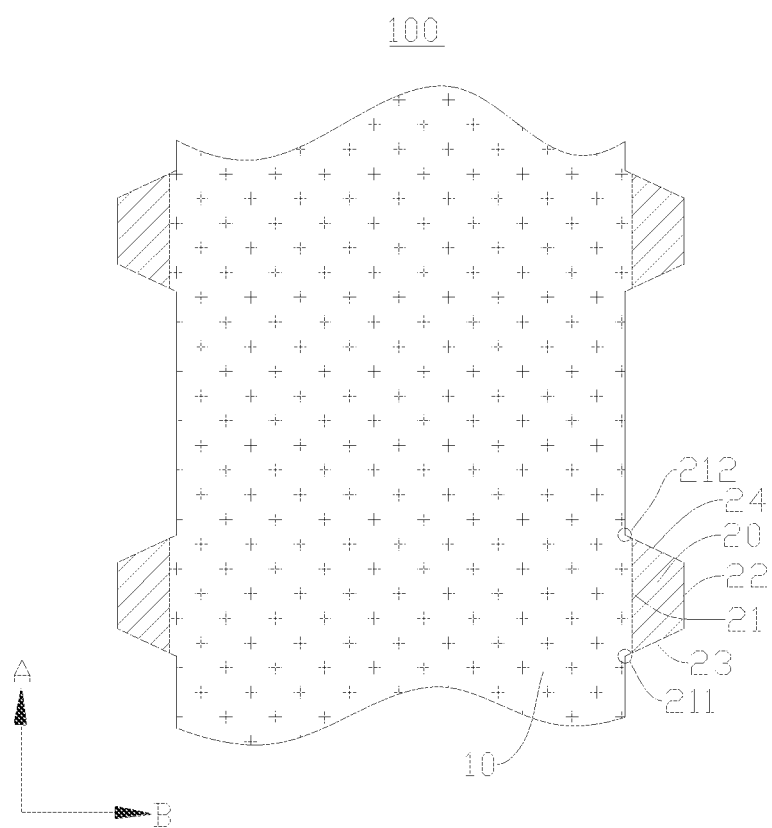
FIG. 1 is a schematic structural diagram of an electrode plate.

100. electrode plate;
10. body portion;
20. tab;
21. root edge;
211. first root;
212. second root;
22. top edge;
23. first side edge;
24. second side edge;
1000. substrate;
200. edge portion;
210. bottom edge;
3000. device for forming electrode plate;
3100. cutting apparatus;
3110. first cutting apparatus;
3120. second cutting apparatus;
3200. transfer apparatus;
3210. transfer roller;
3300. dust collection apparatus;
3310. first dust collection apparatus;
3311. first negative-pressure generating mechanism;
33111. absorption support portion;
33112. dust discharge duct;
33113. absorption face;
33114. absorption hole;
33115. dust absorption hole;
33116. cutting face;
33117. cutting hole;
3320. second dust collection apparatus;
3330. waste guiding apparatus;
3331. mounting support;
3332. absorption belt;
3333. driving gear;
3334. driven gear;
3335. drive member;
3400. waste collection area;
A. first direction;
B. second direction;
O1. first position; and
O2. second position.

DETAILED DESCRIPTION

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all embodiments of this application. Generally, the components of the embodiments of this application as described and illustrated in the accompanying drawings herein can be arranged and designed in a variety of configurations.

Therefore, the following detailed description of the embodiments of this application as provided in the accompanying drawings is not intended to limit the scope of this application but merely to represent selected embodiments of this application. All other embodiments obtained by a person of ordinary skill in the art based on the embodiments of this application without creative efforts shall fall within the protection scope of this application.

It should be noted that, without conflict, the embodiments and features in the embodiments in this application may be combined with each other.

It should be noted that similar reference signs and letters indicate similar items in the following drawings, and therefore once an item is defined in one drawing, it does not need to be further defined and explained in the subsequent drawings.

In the description of the embodiments of this application, it should be noted that the orientations or positional relationships as indicated are orientations or positional relationships based on the accompanying drawings, or conventional orientations or positional relationships of products of this application, or orientations or positional relationships as conventionally understood by persons skilled in the art, and the orientations or positional relationships as indicated are merely for ease and brevity of description of this application rather than indicating or implying that the apparatuses or elements mentioned must have specific orientations or must be constructed or manipulated according to specific orientations, and therefore cannot be understood as limitations on this application. In addition, the terms "first", "second", "third", and the like are merely intended for distinguishing purposes and shall not be understood as any indication or implication of relative importance.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, square prismatic cell, and pouch cell. The type of battery is not limited in the embodiments of this application either.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied onto a surface of the positive electrode current collector. The part of positive electrode current collector uncoated with the positive electrode active substance layer protrudes out of the part of positive electrode current collector coated with the positive electrode active substance layer and serves as at least part of a positive tab. In some embodiments, a positive tab of the positive electrode plate is a positive electrode current collector uncoated with a positive electrode active substance layer. In some other embodiments, to guarantee the structural strength of the positive tab, the positive tab includes a positive electrode current collector uncoated with the positive electrode active substance layer and a positive electrode current collector partially coated with the positive electrode active substance layer. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied onto a surface of the negative electrode current collector. The part of negative electrode current collector uncoated with the negative electrode active substance layer protrudes out of the part of negative electrode current collector coated with the negative electrode active substance layer and serves as at least part of a negative tab. In some embodiments, a negative tab of the negative electrode plate is a negative electrode current collector uncoated with a negative electrode active substance layer. In some other embodiments, to guarantee the structural strength of the negative tab, the negative tab includes a negative electrode current collector uncoated with the negative electrode active substance layer and a negative electrode current collector partially coated with the negative electrode active substance layer. The negative electrode current collector may be made of copper, and the negative electrode active substance may be carbon, silicon, or the like. To allow excessive current to pass through without any fusing, multiple positive tabs are provided and stacked together, and multiple negative tabs are provided and stacked together. The separator may be made of PP (polypropylene, polypropylene), PE (polyethylene, polyethylene), or the like. In addition, the electrode assembly may be a winding structure or a laminated structure, but the embodiments of this application are not limited thereto.

In the prior art, a positive electrode plate is formed as follows:
  applying a positive electrode active substance layer in a given width onto a positive electrode current collector; and performing cutting on the part of positive electrode current collector uncoated with the positive electrode active substance layer to form a plurality of positive electrode tabs that are spaced apart in a length direction of the positive electrode current collector, where based on different cutting depths, the positive electrode tabs formed may include or not include the positive electrode active substance layer.

In the prior art, a negative electrode plate is formed as follows:
  applying a negative electrode active substance layer in a given width onto a negative electrode current collector; and performing cutting on the negative electrode current collector uncoated with the negative electrode active substance layer to form a plurality of negative electrode tabs that are spaced apart in a length direction of the negative electrode current collector, where based on different cutting depths, the negative electrode tabs formed may include or not include the negative electrode active substance layer.

As shown in FIG. 1, an electrode plate 100 (positive electrode plate 100 or negative electrode plate 100) formed includes a body portion 10 and tabs 20, where the tabs 20 protrude from the body portion 10 at an edge of the body portion 10. Each tab 20 has a root edge 21 connecting to the body portion 10, and along an extension direction of the root edge 21, each tab 20 has a first root 211 and a second root 212 located at two ends of the root edge 21. Each tab 20 has a top edge 22 disposed opposite the root edge 21, and the direction in which the root edge 21 and the top edge 22 are opposite is a height direction of the corresponding tab 20. Each tab 20 has a first side edge 23 and a second side edge 24 that are disposed opposite. One end of the first side edge 23 and the root edge 21 intersect at the first root 211, and the other end of the first side edge 23 intersects the top edge 22. One end of the second side edge 24 intersects the root edge 21 at the second root 212, and the other end of the second side edge 24 intersects the top edge 22. The direction in which the first side edge 23 and the second side are opposite is a width direction of the corresponding tab 20.

Figure 2:
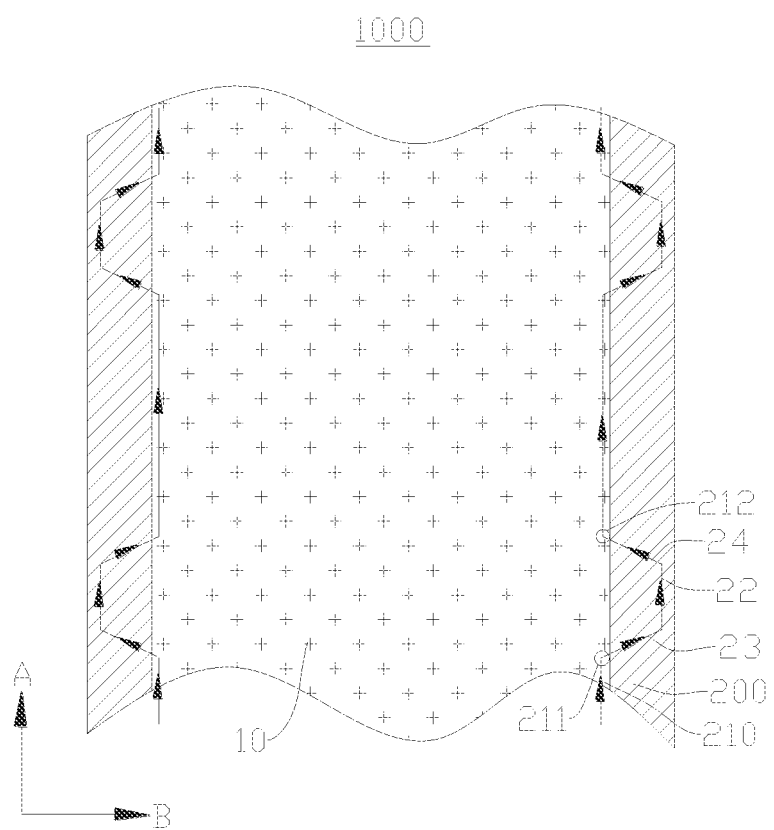
FIG. 2 is a schematic diagram of a cutting path of forming an electrode plate in the prior art.
Figure 3:
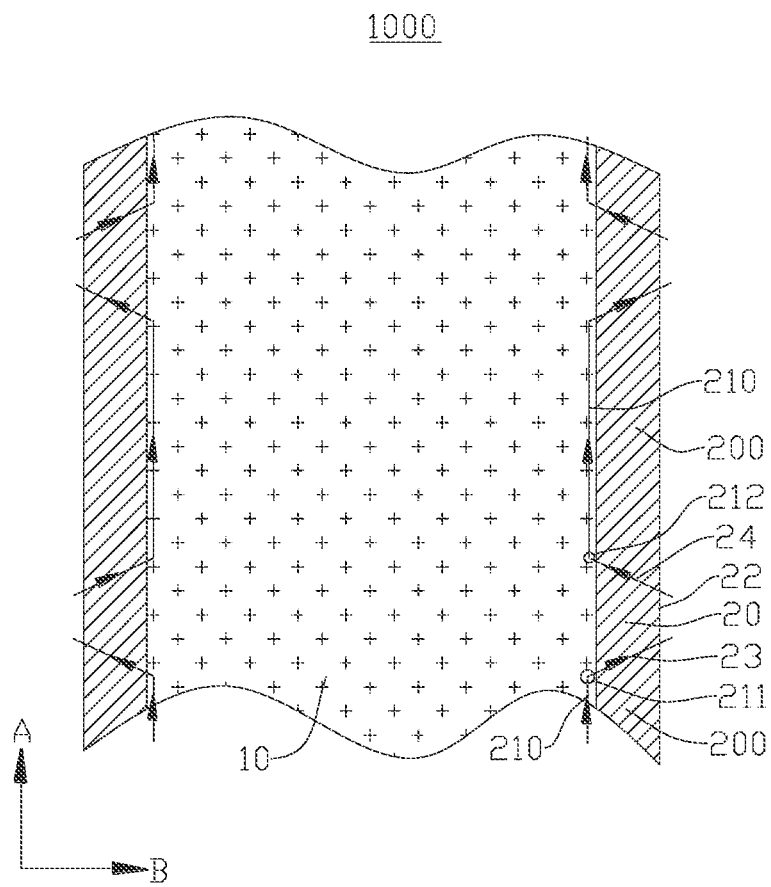
FIG. 3 is a schematic diagram of another cutting path of forming an electrode plate in the prior art.

The inventors have found that, for either a positive electrode plate 100 or a negative electrode plate 100, the tab 20 is formed in one step during cutting. As shown in FIG. 2, cutting is performed along a straight edge first to separate a bottom edge 210 of the edge portion 200 from the body portion 10; cutting is performed along the first side edge 23 of the tab 20 from the first root 211 of the tab 20 to the top edge 22 of the tab 20; then cutting is performed in a straight line along the top edge 22 of the tab 20 for a specific distance to separate the top edge 22 of the tab 20 from the edge portion 200; and cutting is performed along the second side edge 24 of the tab 20 from the top edge 22 of the tab 20 to the second root 212 to separate the edge portion 200 from the tab 20 finally, so as to form a tab 20. In another existing method for forming the tab 20, as shown in FIG. 3, cutting is performed along a straight edge first to separate the bottom edge 210 of the edge portion 200 from the body portion 10; then cutting is performed along the first side edge 23 of the tab 20 from the first root 211 of the tab 20 to the top edge 22 of the tab 20; after a cutting apparatus 3100 moves a specific distance relative to the substrate 1000, cutting is performed along the second side edge 24 of the tab 20 from the top edge 22 of the tab 20 to the second root 212 to separate the edge portion 200 from the tab 20 finally, so as to form a tab 20. This method requires no cutting the top edge 22 of the tab 20.

In the methods for cutting the electrode plate 100 shown in FIG. 2 and FIG. 3, after the step of performing cutting along a straight edge to separate the bottom edge 210 of the edge portion 200 from the body portion 10 is done, the edge portion 200 vibrates due to reasons such as unstable airflow and mechanical vibration. Because the edge portion 200 connects to at least one side edge of the tab 20, vibration of the edge portion 200 causes the tab 20 to vibrate so that the edge portion 200 continuously pulls the tab 20, causing the tab 20 to be deformed or even damaged, thereby resulting in a decrease in product pass rate. In addition, in the process of transitioning from the bottom edge 210 of the edge portion 200 to the first side edge 23, changing a cutting direction is required, that is, changing a cutting direction at the position of the first root 211 is required. In addition, in the process of transitioning from the second side edge 24 to the bottom edge of the edge portion 200, changing a cutting direction is required, that is, changing a cutting direction at the position of the second root 212 is required. A path to change the direction is relatively long, thus consuming long time, thereby greatly affecting the production efficiency of the electrode plate 100.

In view of this, the embodiments of this application provide a technical solution: first separating the edge portion 200 from the tab 20, and then separating the edge portion 200 from the body portion 10. This greatly reduces the risk of decrease in product pass rate that is resulting from deformation of the tab 20 caused by vibration of the edge portion 200 and damage to the tab 20 caused by being pulled by the edge portion 200, and increases the forming quality of the electrode plate 100.

The technical solution described in the embodiments of this application is applicable to both the positive electrode plate 100 and the negative electrode plate 100.

Figure 4:
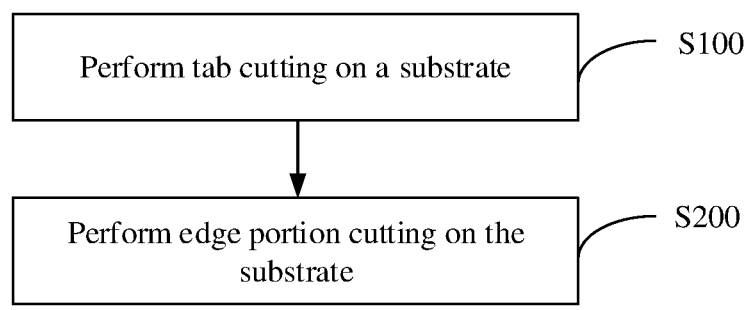
FIG. 4 is a flowchart of a method for forming an electrode plate according to some embodiments of this application.

As shown in FIG. 4, the method for forming the electrode plate 100 includes the following steps.

Step S100: Perform tab 20 cutting on the substrate 1000, so that the substrate 1000 forms the body portion 10, the edge portion 200 connecting to the body portion 10, and the plurality of tabs 20 that connect to the body portion 10 but are separated from the edge portion 200.

It should be noted that, if the positive electrode plate 100 is formed by using this method for forming an electrode plate 100, the substrate 1000 includes a positive electrode current collector and a positive electrode active substance layer applied onto a surface of the positive electrode current collector, where width of the positive electrode active substance layer is smaller than that of the positive electrode current collector; and if the negative electrode plate 100 is formed by using this method for forming an electrode plate 100, the substrate 1000 includes a negative electrode current collector and a negative electrode active substance layer applied onto a surface of the negative electrode current collector, where width of the negative electrode active substance layer is smaller than that of the negative electrode current collector.

Step S200: Perform edge portion 200 cutting on the substrate 1000 to separate the edge portion 200 from the body portion 10.

The electrode plate 100 forming is implemented in two steps. In the first step, the tab 20 and the edge portion part 200 are separated, so that in the process of cutting, vibration of the edge portion 200 has an extremely small impact on the tab 20, greatly reducing the risk of decrease in product pass rate that is resulting from deformation of the tab 20 caused by vibration of the edge portion 200 and damage to the tab 20 caused by being pulled by the edge portion 200, and also increasing the forming quality of the electrode plate 100. In the second step, after the edge portion 200 and the tab 20 are separated, edge portion 200 cutting is performed to separate the edge portion 200 from the body portion 10. The electrode plate 100 cutting is completed.

The tab 20 cutting is performed first on the substrate 1000 so that both the first side edge 23 and the second side edge 24 of the tab 20 are separated from the edge portion 200. When the edge portion 200 cutting is performed, the cutting needs to be performed along a path to the first root 211 and the second root 212 so that the edge portion 200 and the body portion 10 are separated. There is no need to change cutting directions at the position of the first root 211 and the position of the second root 212, saving the time of changing a cutting direction, thereby shortening the time of forming the electrode plate 100 and raising the production efficiency of the electrode plate 100.

In some embodiments, in step S100, the performing tab 20 cutting on the substrate 1000 includes:

performing cutting on the substrate 1000 multiple times, where a group of cutting lines that separate one of the tabs 20 from the edge portion 200 are formed on the substrate 1000 in each cutting.

A group of cutting lines that separate one of the tabs 20 from the edge portion 200 are formed in each cutting, so that each tab 20 can be separated from the edge portion 200, making each tab 20 less affected by vibration of the edge portion 200, thereby reducing the risk of deformation of the substrate 1000 at the tab 20 caused by vibration of the edge portion 200 and damage to the tab 20 caused by being pulled by the edge portion 200, thereby increasing the pass rate and quality of the electrode plate 100.

In other embodiments, in step S100, performing tab 20 cutting on the substrate 1000 may include:

performing one cutting on the substrate 1000, where a plurality of groups of cutting lines that separate a plurality of the tabs 20 from a plurality of the edge portions 200 are formed on the substrate 1000 by one cutting, and one group of cutting lines separate one of the tabs 20 from the edge portion 200. That is, a plurality of tabs 20 are formed in one cutting, thereby greatly raising the tab 20 cutting efficiency, and thus raising the forming efficiency of the electrode plate 100.

In some embodiments, the performing cutting on the substrate 1000 multiple times includes:

performing cutting on the substrate 1000 multiple times in the process of transferring the substrate 1000 in a first direction A, where a group of cutting lines that separate one of the tabs 20 from the edge portion 200 are formed on the substrate 1000 in each cutting.

The performing cutting on the substrate 1000 multiple times in the process of transferring the substrate 1000 in the first direction A means that transferring the substrate 1000 and cutting the tab 20 are performed simultaneously, which can raise the tab 20 cutting efficiency.

In some embodiments, the direction of transferring the substrate 1000 is consistent with a width direction of the tab 20. That is, the first direction A is consistent with the width direction of the tab 20. In some embodiments, the direction of transferring the substrate 1000 is consistent with the length direction of the substrate 1000. The tabs 20 are formed by performing cutting on at least one side of the substrate 1000 in the width direction thereof.

In some embodiments, the performing cutting on the substrate 1000 multiple times in the process of transferring the substrate 1000 in the first direction A may include:

in the process of transferring the substrate 1000 in the first direction A, performing cutting on the substrate 1000 by using a cutting apparatus 3100 to reciprocate in a second direction B, where the first direction A intersects the second direction B.

The first direction A of transferring the substrate 1000 and the second direction B of cutting the tab 20 can form tabs 20 with a specific contour and form tabs 20 in a specific direction of the substrate 1000, thereby meeting different production and use needs. The cutting apparatus 3100 reciprocating in the second direction B to perform the tab 20 cutting not only makes the contours of each tab 20 uniform, but also raises the tab 20 cutting efficiency. The performing cutting on the substrate 1000 multiple times in the process of transferring the substrate 1000 in the first direction A means that transferring the substrate 1000 and cutting the tab 20 are performed simultaneously, which can raise the tab 20 cutting efficiency.

For example, in some embodiments, the first direction A is perpendicular to the second direction B, so that the inclined first side edge 23 and second side edge 24 are finally formed. For another example, the first direction A and the second direction B are arranged at an acute angle or an obtuse angle.

Based on the different angles between the first direction A and the second direction B, that is, different moving directions of the cutting apparatus 3100 relative to the substrate 1000, different tab 20 contours can be formed.

Figure 5:
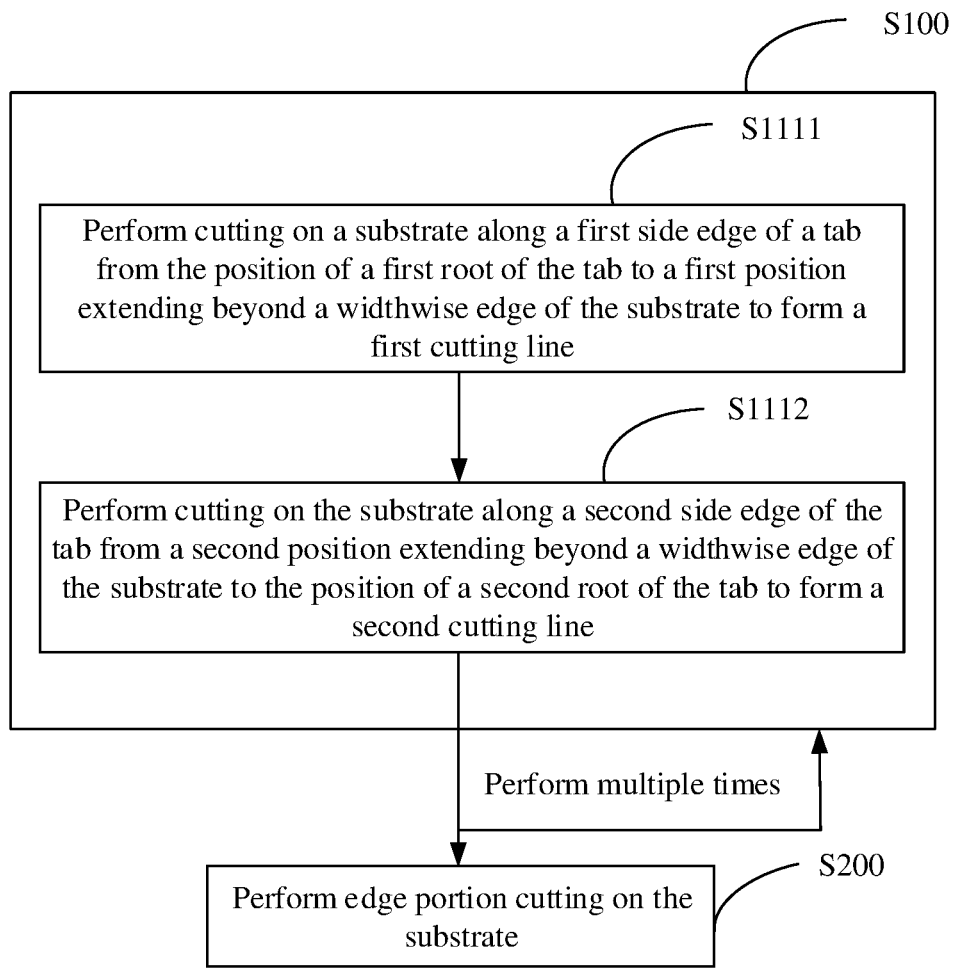
FIG. 5 is a flowchart of a method for forming an electrode plate according to some other embodiments of this application.
Figure 6:
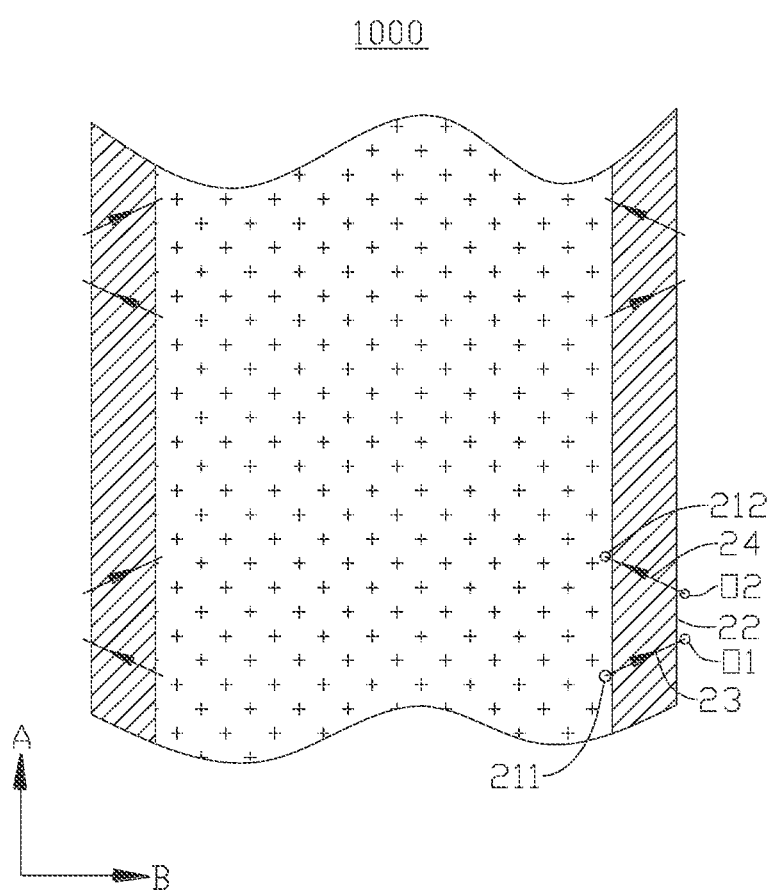
FIG. 6 is a schematic diagram of a path for cutting an electrode plate according to some other embodiments of this application.
Figure 7:
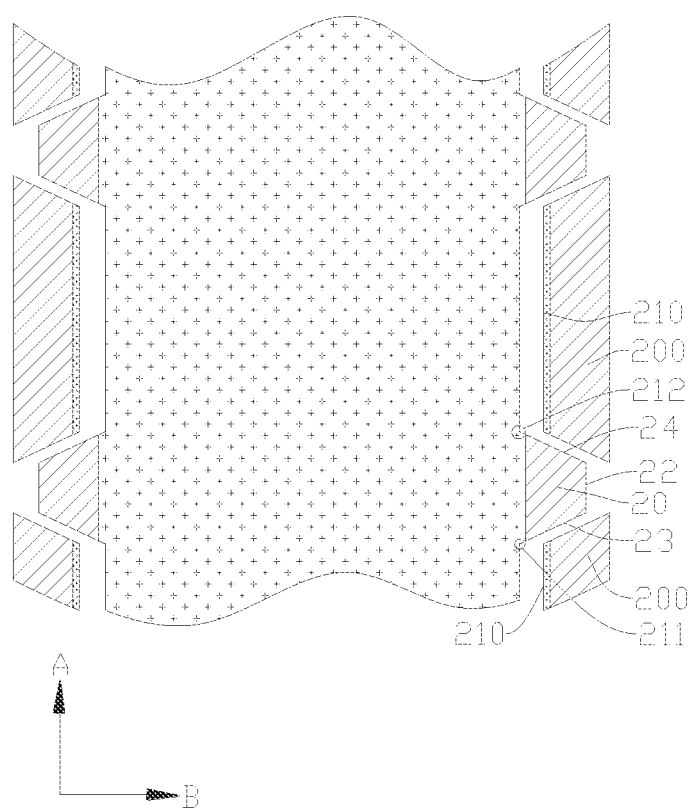
FIG. 7 is a schematic diagram of a substrate being cut to form discontinuous edge portions according to some other embodiments of this application.

In some embodiments, as shown in FIG. 5, FIG. 6, and FIG. 7, each group of cutting lines include a first cutting line and a second cutting line. That a group of cutting lines that separate one of the tabs 20 from the edge portion 200 are formed on the substrate 1000 includes:

Step S1111: The substrate 1000 is cut along the first side edge 23 of the tab 20 from the position of the first root 211 of the tab 20 to a first position O1 extending beyond a widthwise edge of the substrate 1000 to form the first cutting line; and Step S1112: The substrate 1000 is cut along the second side edge 24 of the tab 20 from a second position O2 extending beyond a widthwise edge of the substrate 1000 to the position of the second root 212 of the tab 20 to form the second cutting line.

It should be noted that an execution order of step S1111 and step S1112 is not limited, which means that step S1111 may be followed by step S1112, where the first cutting line extends from the first root 211 to a position beyond a widthwise edge of the substrate 1000, to be specific, the first side edge 23 of the tab 20 is formed by cutting from the first root 211 of the tab 20 to the widthwise edge of the substrate 1000. After the substrate 1000 is moved for a distance in the first direction A, the cutting apparatus 3100 moves, relative to the substrate 1000, from the first position O1 beyond the widthwise edge of the substrate 1000 to the second position O2 beyond the widthwise edge of the substrate 1000. The second cutting line extends from the second position O2 to the second root 212 of the tab 20, to be specific, the second side edge 24 of the tab 20 is formed by cutting from the second position O2 to the second root 212 of the tab 20. In this cutting method, the cutting apparatus 3100 only needs to reciprocate once in the second direction B to form a group of cutting lines that separate one of the tabs 20 from the edge portion 200, where the formed edge portion 200 includes discontinuous edge portions in the first direction A, and two adjacent discontinuous edge portions are respectively located on a side on which the first side edge 23 of the tab 20 is located and a side on which the second side edge 24 is located, so as to adapt to different electrode plate 100 forming processes.

In some other embodiments, step S1112 may also be performed first and then step S1111 is performed.

In some embodiments, one end of the first cutting line and one end of the second cutting line can extend to the active substance layer of the substrate 1000, so that the tab 20 is partially applied with the active substance layer to enhance the structural strength of the tab 20.

In some other embodiments, one end of the first cutting line and one end of the second cutting line may alternatively extend to a position on a widthwise side of the active substance layer so that the formed tab 20 is a current collector applied without any active substance layer.

In addition, the cutting apparatus 3100 moving, relative to the substrate 1000, from the first position O1 beyond the widthwise edge of the substrate 1000 to the second position O2 beyond the widthwise edge of the substrate 1000 may be that the position of the cutting apparatus 3100 is fixed and only the substrate 1000 is transferred in the first direction A, or may be that in the process of transferring the substrate 1000 in the first direction A, the cutting apparatus 3100 moves in a direction opposite to the moving direction of transferring the substrate 1000, thereby increasing a moving speed of the cutting apparatus 3100 relative to the substrate 1000, and thus raising the production efficiency.

In other embodiments, in step S111, that a group of cutting lines that separate one of the tabs 20 from the edge portion 200 are formed on the substrate 1000 may include:

the substrate 1000 is cut along the first side edge 23 of the tab 20 from the position of the first root 211 of the tab 20 to the first position O1 extending beyond a widthwise edge of the substrate 1000 to form the first cutting line; and the substrate 1000 is cut along the second side edge 24 of the tab 20 from the position of the second root 212 of the tab 20 to a second position O2 extending beyond a widthwise edge of the substrate 1000 to form the second cutting line.

It should be noted that, the substrate 1000 may be cut along the first side edge 23 of the tab 20 from the position of the first root 211 of the tab 20 to the first position O1 extending beyond a widthwise edge of the substrate 1000 so as to form the first cutting line first, and then the substrate 1000 is cut along the second side edge 24 of the tab 20 from the position of the second root 212 of the tab 20 to a second position O2 extending beyond a widthwise edge of the substrate 1000 so as to form the second cutting line, where the first cutting line extends from the first root 211 to a position beyond the widthwise edge of the substrate 1000, which means that the first side edge 23 of the tab 20 is formed by cutting from the first root 211 of the tab 20 to the widthwise edge of the substrate 1000. After the first side edge 23 is formed, the cutting apparatus 3100 stops and moves in a reverse direction, while the substrate 1000 is moved some distance in the first direction A, and the cutting apparatus 3100 moves, relative to the substrate 1000, from the first root 211 to the second root 212. The second cutting line extends from the second position O2 to the second root 212 of the tab 20, which means that the second side edge 24 of the tab 20 is formed by cutting from the second root 212 to the widthwise edge of the substrate 1000. This cutting method requires the cutting apparatus 3100 to reciprocate twice in the second direction B to form a group of cutting lines that separate one of the tabs 20 from the edge portion 200, where the formed edge portion 200 includes discontinuous edge portions in the first direction A and two adjacent discontinuous edge portions are respectively located on a side on which the first side edge 23 of the tab 20 is located and a side on which the second side edge 24 is located, so as to adapt to different electrode plate 100 forming processes.

In addition, that the cutting apparatus 3100 moves, relative to the substrate 1000, from the first root 211 to the second root 212 may be implemented through fixing the position of the cutting apparatus 3100 and transferring only the substrate 1000 in the first direction A, or may be implemented through, in the process of transferring the substrate 1000 in the first direction A, and moving the cutting apparatus 3100 in a direction opposite to the direction of transferring the substrate 1000, thereby increasing the moving speed of the cutting apparatus 3100 relative to the substrate 1000, and thus raising the production efficiency.

In some other embodiments, alternatively, the substrate 1000 may be cut along the second side edge 24 of the tab 20 from the position of the second root 212 of the tab 20 to a second position O2 extending beyond a widthwise edge of the substrate 1000 so as to form the second cutting line first, and then the substrate 1000 is cut along the first side edge 23 of the tab 20 from the position of the first root 211 of the tab 20 to the first position O1 extending beyond a widthwise edge of the substrate 1000 so as to form the first cutting line.

In another embodiment, that a group of cutting lines that separate one of the tabs 20 from the edge portion 200 are formed on the substrate 1000 in each cutting includes:

the substrate 1000 is cut along the first side edge 23 of the tab 20 from the first position O1 beyond the widthwise edge of the substrate 1000 to the position of the first root 211 of the tab 20 so as to form a first cutting line; and the substrate 1000 is cut along the second side edge 24 of the tab 20 from the second position O2 beyond the widthwise edge of the substrate 1000 to the position of the second root 212 of the tab 20 so as to form a second cutting line.

It should be noted that the substrate 1000 may be cut along the first side edge 23 of the tab 20 from the first position O1 beyond the widthwise edge of the substrate 1000 to the position of the first root 211 of the tab 20 so as to form the first cutting line first, and then the substrate 1000 is cut along the second side edge 24 of the tab 20 from the second position O2 beyond the widthwise edge of the substrate 1000 to the position of the second root 212 of the tab 20 so as to form the second cutting line. The first cutting line extends from the first position O1 beyond the widthwise edge of the substrate 1000 to the first root 211, to be specific, the first side edge 23 of the tab 20 is formed by cutting from the first position O1 beyond the widthwise edge of the substrate 1000 to the first root 211. After the first side edge 23 is formed, the cutting apparatus 3100 stops cutting and moves in the reverse direction of the second direction B, and the substrate 1000 moves some distance in the first direction A. To be specific, the cutting apparatus 3100 moves, relative to the substrate 1000, from the first position O1 beyond the widthwise edge of the substrate 1000 to the second position O2 beyond the widthwise edge of the substrate 1000. The second cutting line extends from the second position O2 to the second root 212 of the tab 20, to be specific, the second side edge 24 of the tab 20 is formed by cutting from the second position O2 to the second root 212 of the tab 20. This cutting method requires the cutting apparatus 3100 to reciprocate twice in the second direction B to form a group of cutting lines that separate one of the tabs 20 from the edge portion 200, where the formed edge portion 200 includes discontinuous edge portions in the first direction, and two adjacent discontinuous edge portions are respectively located on the side on which the first side edge 23 of the tab 20 is located and the side on which the second side edge 24 is located, so as to adapt to different electrode plate 100 forming processes.

Specifically, the cutting apparatus 3100, relative to the substrate 1000, from the first position O1 beyond the widthwise edge of the substrate 1000 to the second position O2 beyond the widthwise edge of the substrate 1000 may be implemented through fixing the position of the cutting apparatus 3100 and only transferring the substrate 1000 in the first direction A, or may be implemented through, in the process of transferring the substrate 1000 in the first direction A, moving the cutting apparatus 3100 in a direction opposite to the direction of transferring the substrate 1000, thereby increasing the moving speed of the cutting apparatus 3100 relative to the substrate 1000, and thus raising the production efficiency.

In some other embodiments, the substrate 1000 may be first cut along the second side edge 24 of the tab 20 from the second position O2 beyond the widthwise edge of the substrate 1000 to the position of the second root 212 of the tab 20 so as to form the second cutting line first, and then the substrate 1000 is cut along the first side edge 23 of the tab 20 from the first position O1 beyond the widthwise edge of the substrate 1000 to the position of the first root 211 of the tab 20 so as to form the first cutting line.

Figure 8:
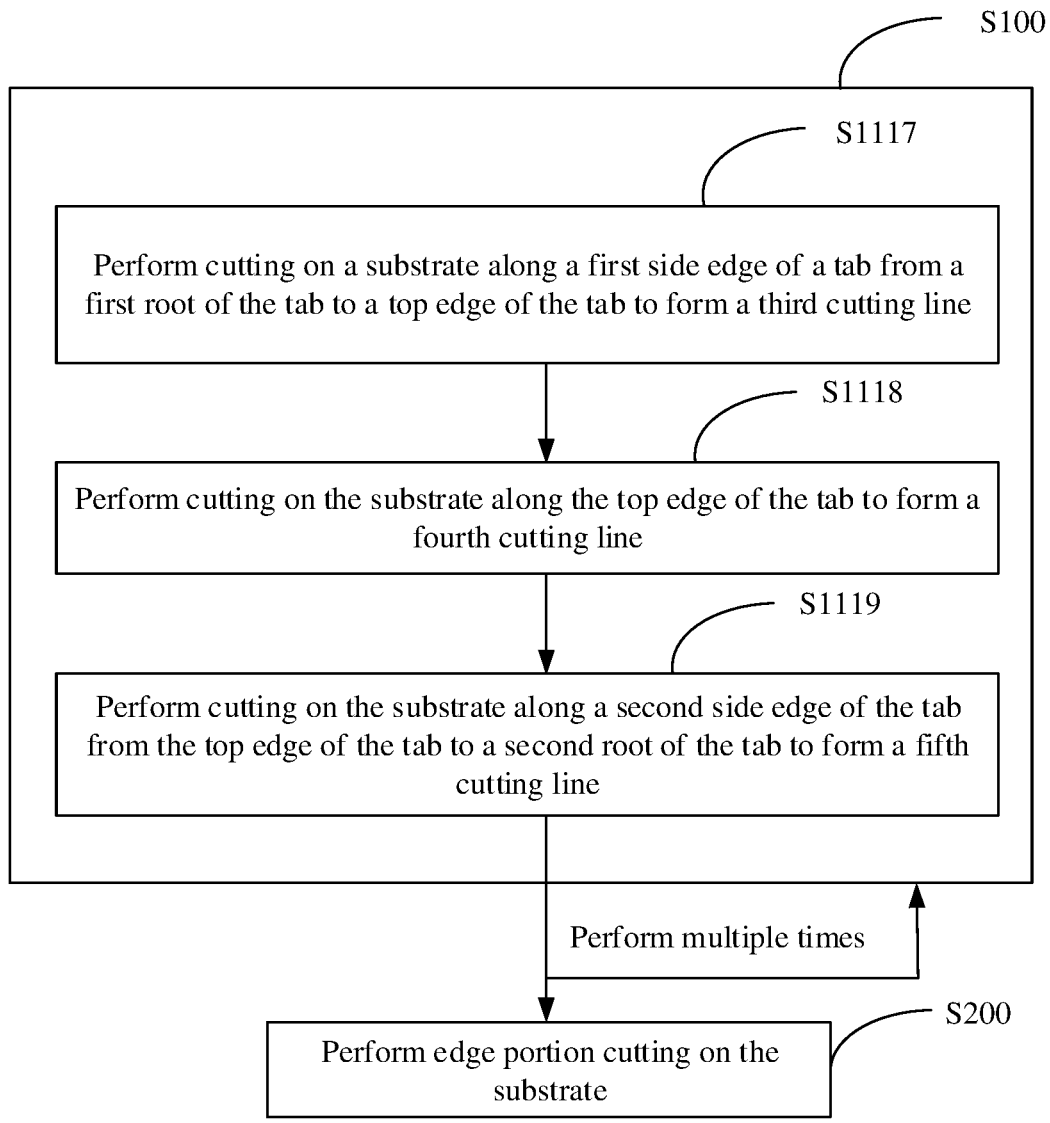
FIG. 8 is a flowchart of a method for forming an electrode plate according to still some other embodiments of this application.
Figure 9:
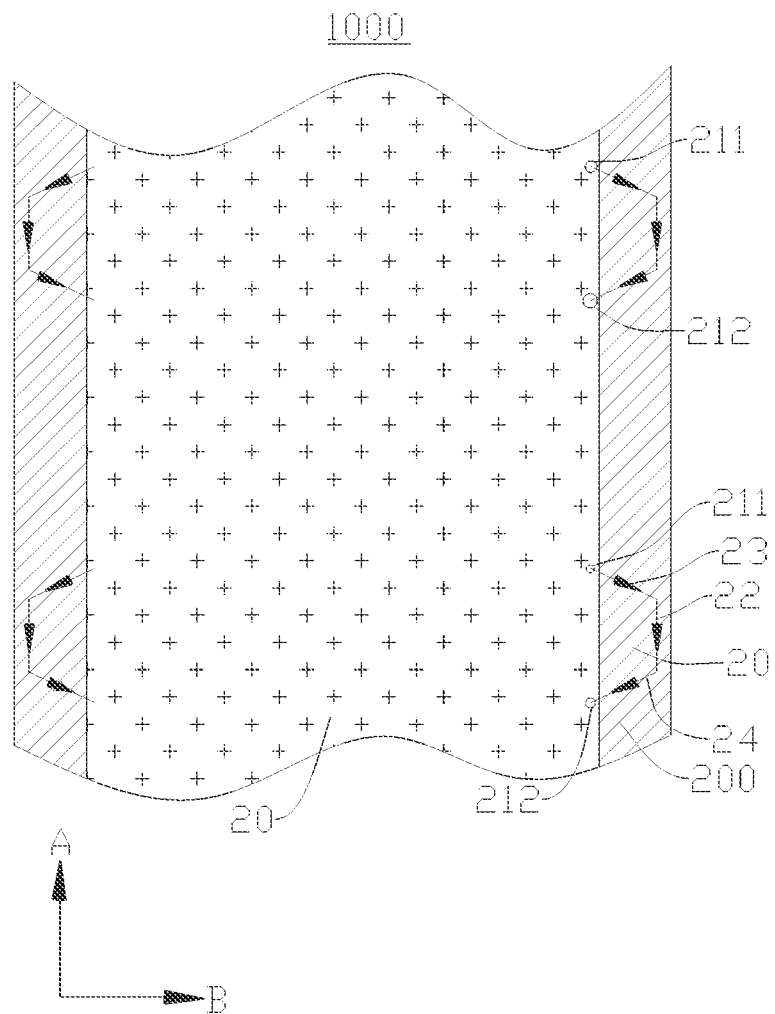
FIG. 9 is a schematic diagram of a path for cutting an electrode plate according to still some other embodiments of this application.
Figure 10:
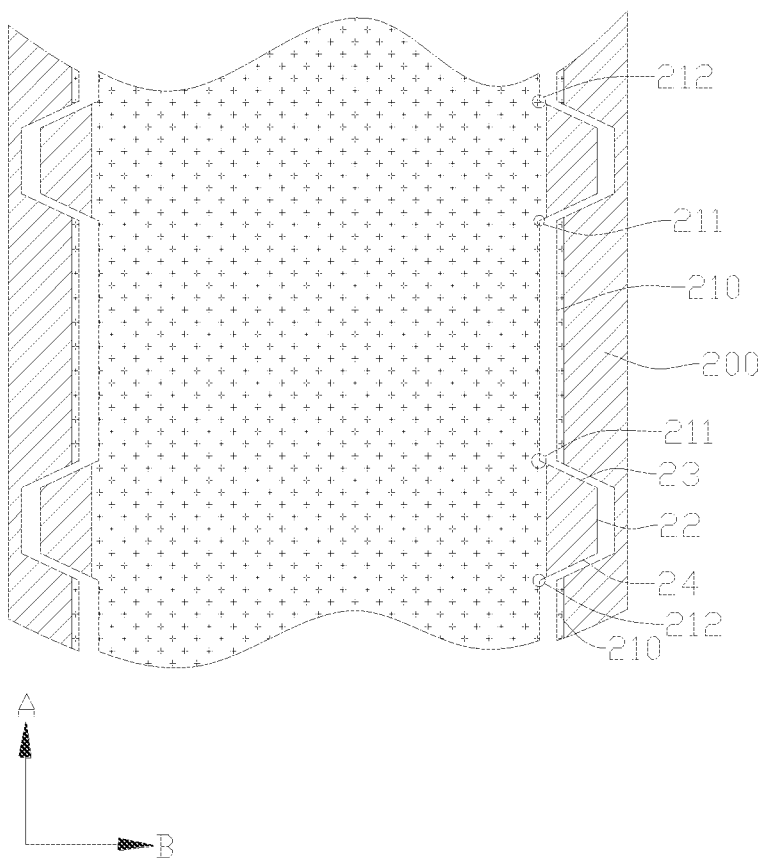
FIG. 10 is a schematic diagram of a substrate being cut to form continuous edge portions according to still some other embodiments of this application.

In some embodiments, as shown in FIG. 8, FIG. 9, and FIG. 10, each group of cutting lines include a third cutting line, a fourth cutting line, and a fifth cutting line, and the third cutting line and the fifth cutting line each are connected to two ends of the fourth cutting line. That a group of cutting lines that separate one of the tabs 20 from the edge portion 200 are formed on the substrate 1000 includes:

Step S1117: The substrate 1000 is cut along the first side edge 23 of the tab 20 from the first root 211 of the tab 20 to the top edge 22 of the tab 20 to form a third cutting line;

Step S1118: The substrate 1000 is cut along the top edge 22 of the tab 20 to form a fourth cutting line; and Step S1119: The substrate 1000 is cut along the second side edge 24 of the tab 20 from the top edge 22 of the tab 20 to the second root 212 of the tab 20 to form a fifth cutting line; where the third cutting line, the fourth cutting line, and the fifth cutting line together separate one of the tabs 20 from the edge portion 200.

Step S1117, Step S1118, and Step S1119 are executed in sequence, where the third cutting line that separates the tab 20 from the edge portion 200 is formed by cutting along the first side edge 23 of the tab 20 from the first root 211 of the tab 20 to the top edge 22 of the tab 20, the fourth cutting line that separates the tab 20 from the edge portion 200 is formed by performing cutting on the substrate 1000 along the top edge 22 of the tab 20, and the fifth cutting line that separates the tab 20 from the edge portion 200 is formed by cutting along the second side edge 24 of the tab 20 from the top edge 22 of the tab 20 to the second root 212 of the tab 20, so that the edge portions 200 formed by the third cutting line, the fourth cutting line, and the fifth cutting line are continuous edge portions 200 so as to adapt to different electrode plate 100 forming processes.

In some other embodiments, step S1119 may be executed first, then step S1118 may be executed, and step S1117 may be executed last.

In some embodiments, step S200 includes:

performing cutting on the substrate 1000 along a connection line between the first root 211 and the second root 212 that are adjacent to each other to separate the edge portion 200 from the body portion 10.

The performing cutting on the substrate 1000 along a connection line between the first root 211 and the second root 212 that are adjacent to each other may be fixing the relative position of the cutting apparatus 3100 and transferring the substrate 1000 in the first direction A so that the cutting apparatus 3100 moves, relative to the substrate 1000, from the first root 211 to the second root 212; or may be moving both the cutting apparatus 3100 and the substrate 1000, where the cutting apparatus 3100 moves in a direction opposite to the direction of transferring the substrate 1000, thereby increasing the moving speed of the cutting apparatus 3100 relative to the substrate 1000, and thus raising the forming efficiency of the electrode plate 100. The edge portion 200 and the body portion 10 are separated along the connection line between the first root 211 and the second root 212 that are adjacent to each other, so that the contour of the body portion 10 formed by cutting are regular, thereby increasing the forming quality of the electrode plate 100.

Figure 11:
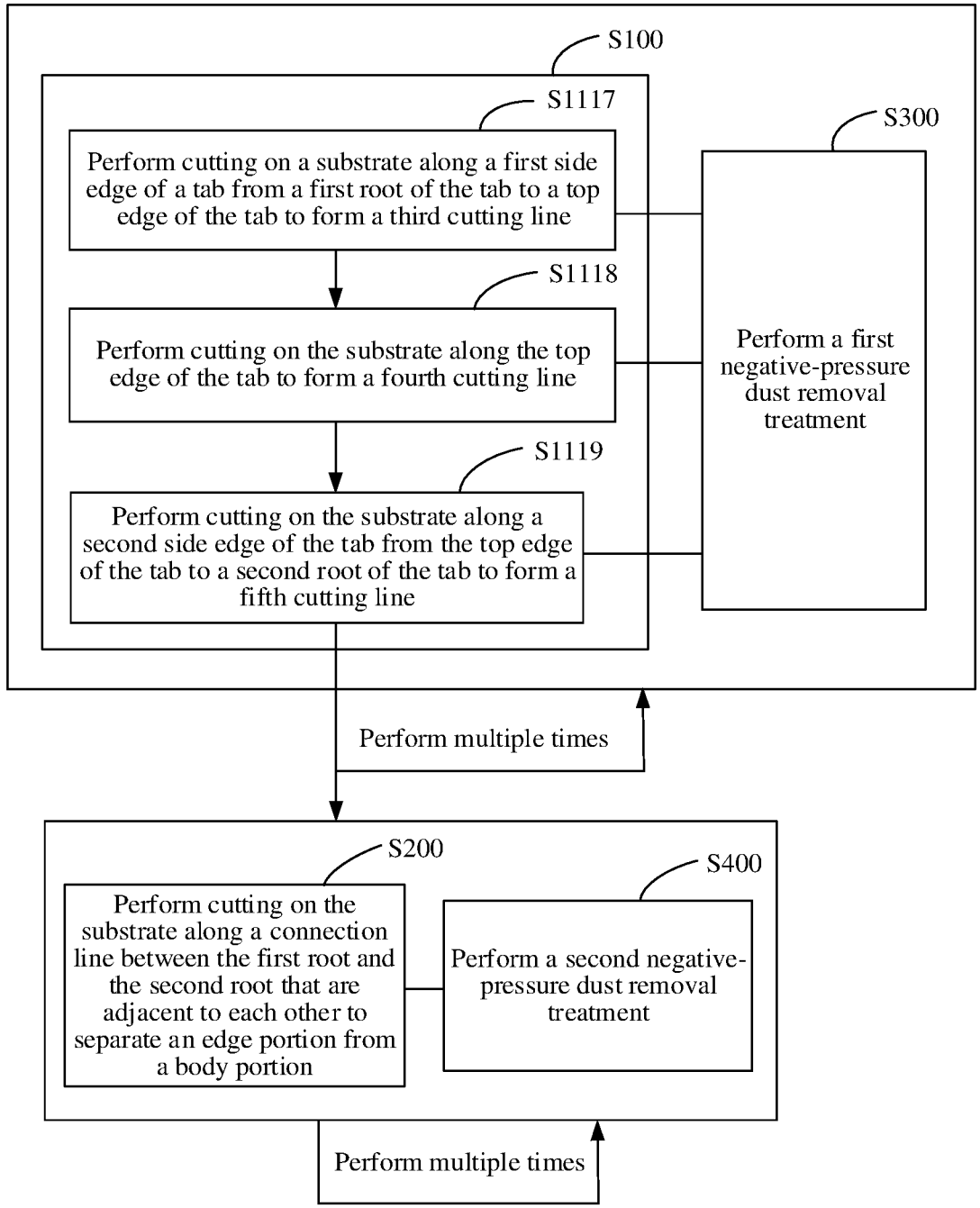
FIG. 11 is a flowchart of a method for forming an electrode plate including a dust removal step according to yet some other embodiments of this application.

As shown in FIG. 11, in some embodiments, the method for forming an electrode plate 100 further includes:

Step S300: performing a first negative-pressure dust removal treatment when performing tab 20 cutting on the substrate 1000; and Step S400: performing a second negative-pressure dust removal treatment when performing edge portion 200 cutting on the substrate 1000, where a negative pressure in the first negative-pressure dust removal treatment is less than or equal to that in the second negative-pressure dust removal treatment. Performing negative-pressure dust removal treatments when performing tab 20 cutting on the substrate 1000 and performing edge portion 200 cutting on the substrate 1000 can ensure the cleanness of the environments of forming the electrode plate 100 and reduce the impact of dust, generated in the process of cutting the substrate 1000, on the electrode plate 100.

In actual production, an amount of dust generated when performing tab 20 cutting on the substrate 1000 is smaller than that of dust generated when performing edge portion 200 cutting on the substrate 1000. Therefore, in some embodiments, a negative pressure in the first negative-pressure dust removal treatment is less than or equal to that in the second negative-pressure dust removal treatment, so that the dust removal capability of the dust collection apparatus 3300 matches the amount of dust generated so as to remove the dust as fully as possible. This not only can meet the need of dust removal but also can help with energy saving and cost saving.

Figure 12:
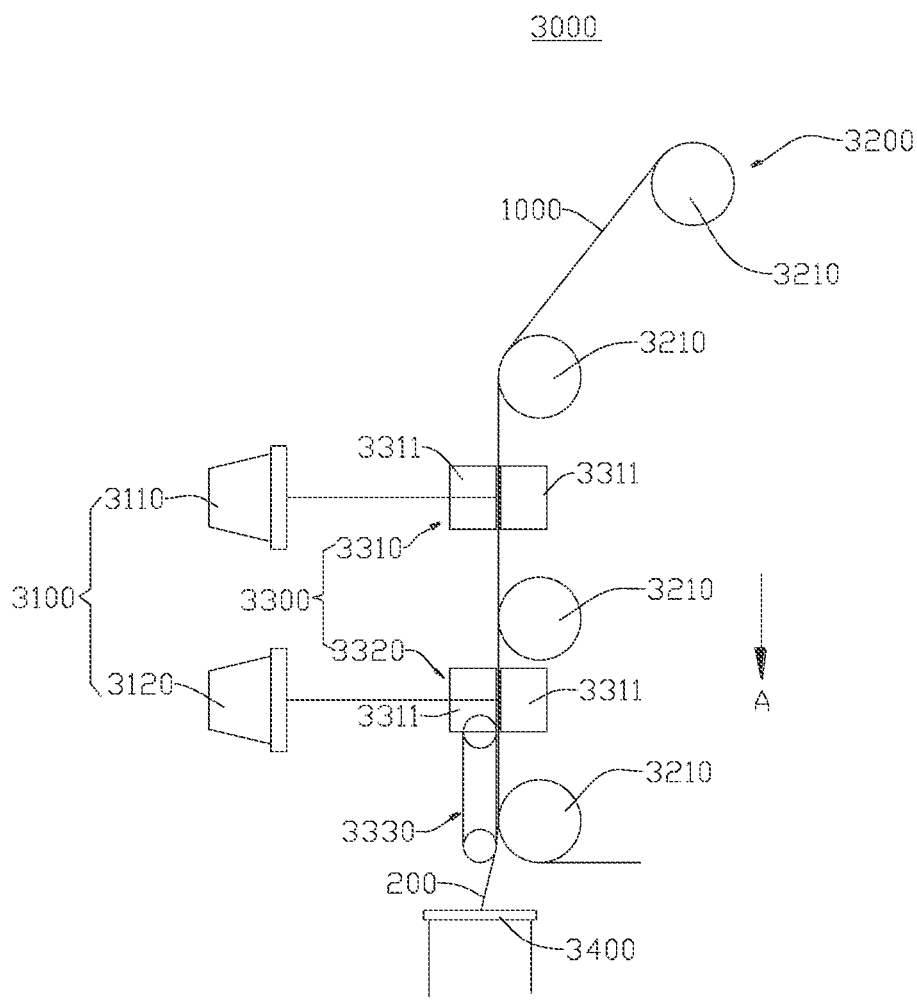
FIG. 12 is a schematic diagram of a device for forming an electrode plate according to some embodiments of this application.

As shown in FIG. 12, an embodiment of this application further provides a device 3000 for forming an electrode plate. The device 3000 for forming an electrode plate includes a cutting apparatus 3100. The cutting apparatus 3100 is configured to perform tab 20 cutting on a substrate 1000 so that the substrate 1000 forms a body portion 10, an edge portion 200 connecting to the body portion 10, and a plurality of tabs 20 that connect to the body portion 10 but are separated from the edge portion 200; and configured to perform edge portion 200 cutting on the substrate 1000 to separate the edge portion 200 from the body portion 10.

The cutting apparatus 3100 can perform cutting on the substrate 1000 in two steps. In the first step, tab 20 cutting is performed on the substrate 1000 to separate the tab 20 from the edge portion 200, so that in the process of cutting, vibration of the edge portion 200 has an extremely small impact on the tab 20, greatly reducing the risk of decrease in product pass rate that is resulting from deformation of the substrate 1000 at the tab 20 caused by vibration of the edge portion 200 and damage to the tab 20 caused by being pulled by the edge portion 200. In the second step, after the edge portion 200 is separated from the tab 20, the cutting apparatus 3100 performs edge portion 200 cutting on the substrate 1000 to separate the edge portion 200 from the body portion 10. The electrode plate 100 cutting is completed.

Still referring to FIG. 12, in some embodiments, the cutting apparatus 3100 includes a first cutting apparatus 3110 and a second cutting apparatus 3120. The first cutting apparatus 3110 is configured to perform tab 20 cutting on the substrate 1000, so that the substrate 1000 forms the body portion 10, the edge portion 200 connecting to the body portion 10, and the plurality of tabs 20 that connect to the body portion 10 but are separated from the edge portion 200. The second cutting apparatus 3120 is configured to perform edge portion 200 cutting on the substrate 1000 to separate the edge portion 200 from the body portion 10.

Different cutting apparatuses 3100 are used to perform tab 20 cutting on the substrate 1000 and perform edge portion 200 cutting on the substrate 1000 respectively, so that the steps of tab 20 cutting and the steps of edge portion 200 cutting do not affect each other, which is conducive to forming high-quality electrode plates 100. In addition, the first cutting apparatus 3110 and the second cutting apparatus 3120 can be controlled independently, so that the operations of the device 3000 for forming an electrode plate are more flexible. The first cutting apparatus 3110 and the second cutting apparatus 3120 can be operated simultaneously. To be specific, in the process of the first cutting apparatus 3110 performing tab 20 cutting on the substrate 1000, the second cutting apparatus 3120 can separate the edge portion 200 that has been separated from the tab 20 from the body portion 10, thereby raising the production efficiency of the electrode plate 100.

Still referring to FIG. 12, in some embodiments, the device 3000 for forming an electrode plate further includes a transfer apparatus 3200, where the transfer apparatus 3200 is configured to transfer the substrate 1000 in a first direction A. The transfer apparatus 3200 transfers the substrate 1000 so that the cutting apparatus 3100 can form the tabs 20 at different positions on the substrate 1000, facilitating forming an electrode plate 100 with a plurality of tabs 20. In addition, the cutting apparatuses 3100 can perform the tab 20 cutting on the substrate 1000 and perform the edge portion 200 cutting on the substrate 1000 in the process that the transfer apparatus 3200 transfers the substrate 1000, which can raise the cutting efficiency and further raise the production efficiency of the electrode plate 100.

As shown in FIG. 12, the transfer apparatus 3200 includes a release roller (not shown in the figure), a winding roller (not shown in the figure), and a transfer roller 3210. The substrate 1000 is wound around the peripheral face of the release roller, and the winding roller is configured to perform winding to the substrate 1000 from one end of the substrate 1000 so to make the substrate 1000 wound on the winding roller. The release roller and the winding roller rotate simultaneously, where the release roller rotates so that the substrate 1000 wound on the release roller is gradually detached from the release roller, and the winding roller rotates so that the substrate 1000 detached from the release roller is gradually wound around the winding roller. The transfer roller is configured to transfer the substrate 1000 from the release roller to the winding roller.

In some embodiments, the second cutting apparatus 3120 is disposed downstream of the first cutting apparatus 3110. The first cutting apparatus 3110 is configured to perform tab 20 cutting on the substrate 1000 in the process of the transfer apparatus 3200 transferring the substrate 1000 in the first direction A; and the second cutting apparatus 3120 is configured to perform edge portion 200 cutting on the substrate 1000 in the process of the transfer apparatus 3200 transferring the substrate 1000 in the first direction A.

It should be noted that the "downstream" and "upstream" mentioned in this application refer to the sequence in which the forming processes of the electrode plate 100 are performed, and are not intended to impose limitations on the first cutting apparatus 3110 and the second cutting apparatus 3120 in their spatial positions.

That the second cutting apparatus 3120 is located downstream of the first cutting apparatus 3110 means that the processes performed by the second cutting apparatus 3120 are after those performed by the first cutting apparatus 3110. For the first cutting apparatus 3110, the first cutting apparatus 3110 is located in the upstream of the second cutting apparatus 3120, in other words, the processes performed by the first cutting apparatus 3110 are before those performed by the second cutting apparatus 3120.

Part of the substrate 1000 on which tab 20 cutting has been done can be transferred to the second cutting apparatus 3120 under the action of the transfer apparatus 3200, and the second cutting apparatus 3120 performs edge portion 200 cutting, so that tab 20 cutting of the substrate 1000 and edge portion 200 cutting of the substrate 1000 can be continuously performed, the first cutting apparatus 3110 can continuously cut the tab 20 of the substrate 1000, and the second cutting apparatus 3120 can continuously cutting the edge portion 200 of the substrate 1000, which can raise the cutting efficiency, thereby raising the production efficiency of the electrode plate 100.

In some embodiments, at least one of the first cutting apparatus 3110 and the second cutting apparatus 3120 is a laser cutting apparatus 3100. The laser cutting apparatus 3100 has advantages such as good cutting quality, high cutting precision, fast cutting speed, and low maintenance cost.

That at least one of the first cutting apparatus 3110 and the second cutting apparatus 3120 is a laser cutting apparatus 3100 means that the first cutting apparatus 3110 or the second cutting apparatus 3120 is the laser cutting apparatus 3100, or that both the first cutting apparatus 3110 and the second cutting apparatus 3120 are the laser cutting apparatuses 3100.

The first cutting apparatus 3110 and the second cutting apparatus 3120 may alternatively be in other forms, for example, the first cutting apparatus 3110 and the second cutting apparatus 3120 are punching apparatuses so that tab 20 cutting and edge portion 200 cutting are performed by punching.

Figure 13:
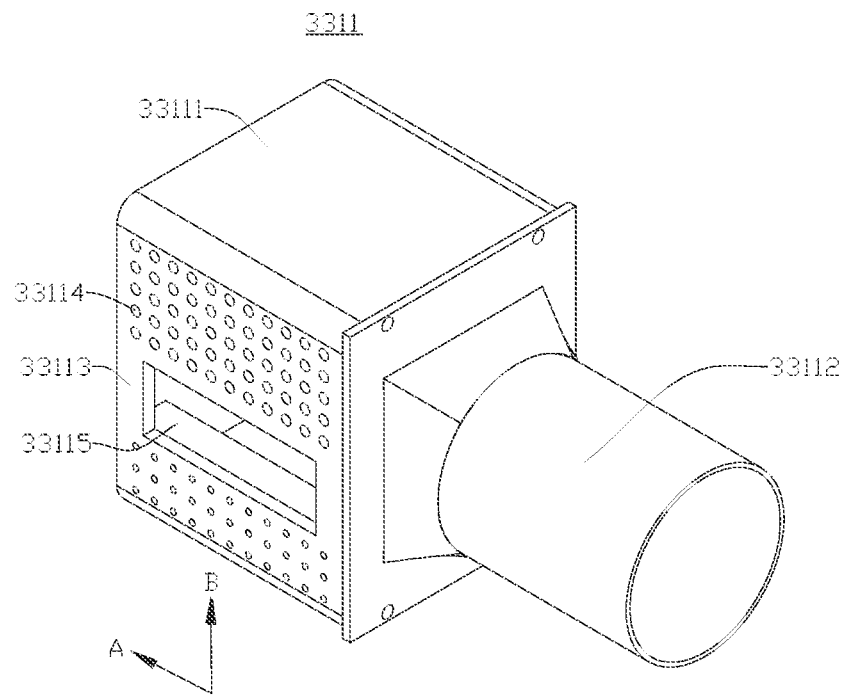
FIG. 13 is a schematic structural diagram of a first negative-pressure generating mechanism from a first view according to some embodiments of this application.

Referring to FIG. 12 and FIG. 13, in some embodiments, the device 3000 for forming an electrode plate further includes a dust collection apparatus 3300, where the dust collection apparatus 3300 is configured to remove dust generated on the substrate 1000 when the cutting apparatus 3100 is cutting the substrate 1000. When the cutting apparatus 3100 is cutting the substrate 1000, the dust collection apparatus 3300 removes the dust generated during cutting, which can ensure the cleanness of the environments of forming the electrode plate 100 and reduce impact of the dust, generated during substrate 1000 cutting, on the electrode plate 100.

In some embodiments, the dust collection apparatus 3300 includes a first dust collection apparatus 3310 and a second dust collection apparatus 3320. The first dust collection apparatus 3310 is configured to remove dust generated on the substrate 1000 when the first cutting apparatus 3110 is performing tab 20 cutting on the substrate 1000. The second dust collection apparatus 3320 is configured to remove dust generated on the substrate 1000 when the second cutting apparatus 3120 is performing edge portion 200 cutting on the substrate 1000. The first dust collection apparatus 3310 and the second dust collection apparatus 3320 are provided for the first cutting apparatus 3110 and the second cutting apparatus 3120 respectively to perform dust removal treatments when performing tab 20 cutting on the substrate 1000 and performing edge portion 200 cutting on the substrate 1000. This makes better dust removal effect, and can ensure the cleanness of the environments of forming the electrode plate 100 and reduce the impact of the dust, generated in the process of cutting the substrate 1000, on the electrode plate 100.

In some other embodiments, the device 3000 for forming an electrode plate may also include only one dust collection apparatus 3300, which mean that when performing tab 20 cutting on the substrate 1000 and performing edge portion 200 cutting on the substrate 1000, the same dust collection apparatus 3300 is used to perform dust removal treatment.

In some embodiments, the first dust collection apparatus 3310 includes a first negative-pressure generating apparatus, the second dust collection apparatus 3320 includes a second negative-pressure generating apparatus, and a negative pressure in the operating of the second negative-pressure generating apparatus is greater than or equal to that in the operating of the first negative-pressure generating apparatus.

Removing dust using a negative-pressure way makes the dust easier to be collected in a specific position (for example, a dust collection position), which reduces the possibility of the dust spreading in the cutting environments, so that the concentration of dust in the air after negative-pressure dust removal is low, and can effectively prevent or reduce the wear of the apparatuses. In addition, transferring under negative pressure is simple and easy to implement.

Because an amount of dust generated when performing tab 20 cutting on the substrate 1000 is smaller than that of dust generated when performing edge portion 200 cutting on the substrate 1000, the negative pressure in the operating of the second negative pressure generating apparatus is greater than or equal to that in the operating of the first negative pressure generating apparatus, which can not only meet the need of dust removal but also help with energy saving and cost saving.

Figure 14:
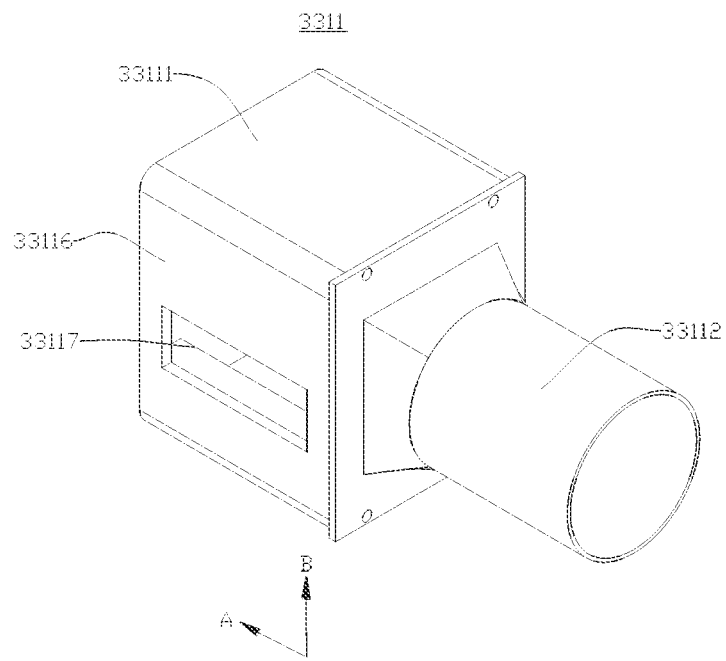
FIG. 14 is a schematic structural diagram of a first negative-pressure generating mechanism from a second view according to some embodiments of this application.

Referring to FIG. 13 and FIG. 14, the first negative-pressure generating apparatus includes at least one first negative-pressure generating mechanism 3311. The first negative-pressure generating mechanism 3311 includes an absorption support portion 33111, a first negative-pressure pump (not shown in the figure), a second negative-pressure pump (not shown in the figure), and a dust discharge duct 33112. A first absorption cavity (not shown in the figure) and a second absorption cavity (not shown in the figure) are formed inside the absorption support portion 33111. The dust discharge duct 33112 communicates with the second absorption cavity. The absorption support portion 33111 has an absorption face 33113, and a plurality of absorption holes 33114 that communicate with the first absorption cavity are disposed on the absorption face 33113. The first negative-pressure pump is configured to generate a negative pressure in the first absorption cavity, so that the substrate 1000 can be attached to the absorption face 33113 under the action of the negative pressure. A dust absorption hole 33115 that communicates with the second absorption cavity is also disposed on the absorption face 33113. The first cutting apparatus 3110 performs tab 20 cutting on the substrate 1000 at a position where the substrate 1000 corresponds to the dust absorption hole 33115. The second negative-pressure pump is configured to form a negative pressure in the second absorption chamber, so that the dust generated when the first cutting apparatus 3110 is performing tab 20 cutting can enter the second absorption chamber through the dust absorption hole 33115 and be discharged from the dust discharge duct 33112.

As shown in FIG. 14, the absorption support portion 33111 also has a cutting face 33116 disposed opposite the absorption face 33113, a cutting hole 33117 is disposed on the cutting face 33116, and the cutting hole 33117 is aligned with the dust absorption hole 33115 and communicates with the second absorption chamber. The laser emitted from the first cutting apparatus 3110 runs through the cutting hole 33117, the second absorption chamber, and the dust absorption hole 33115 sequentially, reaches the substrate 1000, and performs tab 20 cutting on the substrate 1000.

Figure 15:
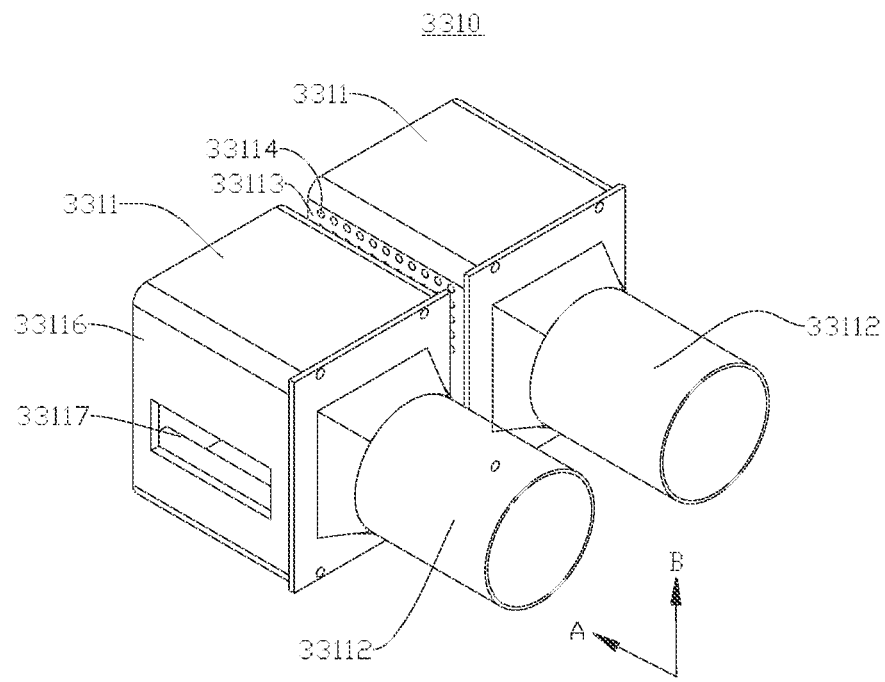
FIG. 15 is a schematic structural diagram of a dust collection apparatus including two first negative-pressure generating mechanisms according to some embodiments of this application.

As shown in FIG. 15, in some embodiments, the first negative-pressure generating apparatus includes two first negative-pressure generating mechanisms 3311. The absorption faces 33113 of the two first negative-pressure generating mechanisms 3311 are opposite and spaced apart. The substrate 1000 is located between the absorption faces 33113 of the two first negative-pressure generating mechanisms 3311. A direction in which the absorption faces 33113 of the two first negative-pressure generating mechanisms 3311 are disposed is perpendicular to a direction of moving the part of the substrate 1000 located between the two absorption faces 33113. An axis line of the dust discharge duct 33112 of the first negative-pressure generating mechanism 3311 is parallel to the direction of moving the part of the substrate 1000 located between the two absorption faces 33113.

In some embodiments, the first negative-pressure generating apparatus includes one first negative-pressure generating mechanism 3311.

In some embodiments, the device 3000 for forming an electrode plate further includes a waste guiding apparatus 3330, where the waste guiding apparatus 3330 is configured to guide the edge portion 200 to the waste collection area 3400 after the edge portion 200 has been separated from the body portion 10. The waste guiding apparatus 3330 can timely guide the edge portion 200 to the waste collection area 3400 after the edge portion 200 has been separated from the body portion 10, thereby raising the working efficiency.

Figure 16:
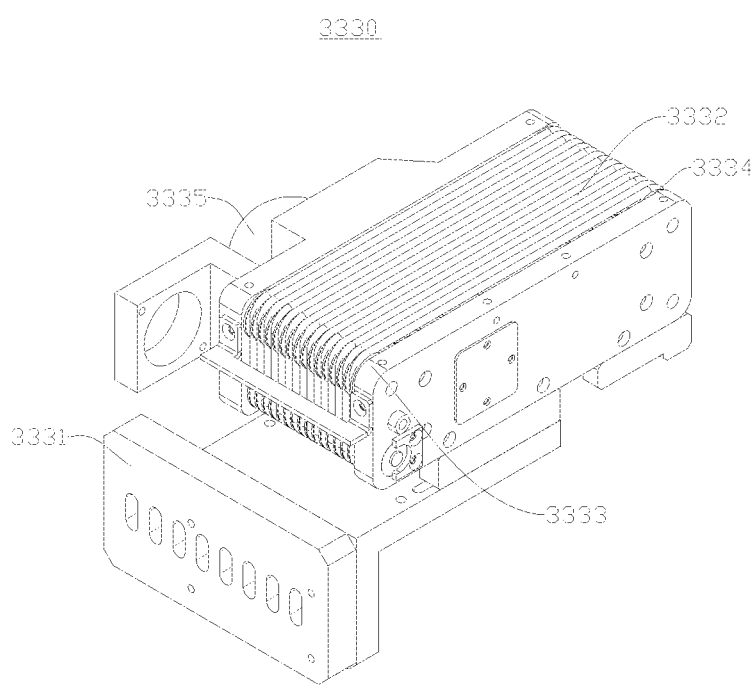
FIG. 16 is a schematic structural diagram of a waste guiding apparatus according to some embodiments of this application.

The waste guiding apparatus 3330 is disposed downstream of the second cutting apparatus 3120. As shown in FIG. 16, in some embodiments, the waste guiding apparatus 3330 includes a mounting support 3331, an absorption belt 3332, a driving gear 3333, a driven gear 3334, a drive member 3335, and a third negative-pressure pump (not shown in the figure). The drive member 3335 is mounted on the mounting support 3331. The driving gear 3333 is mounted on the output shaft of the drive member 3335. The driven gear 3334 is rotationally connected to the mounting support 3331 and is spaced apart from the driving gear 3333. The rotation axis of the driven gear 3334 is parallel to that of the driving gear 3333. The absorption belt 3332 is wound around the driving gear 3333 and the driven gear 3334. The third negative-pressure pump is configured to generate a negative pressure on an internal side of the absorption belt 3332, so that the edge portion 200 can be, when running through the absorption belt 3332, attached to a surface of the absorption belt 3332 under the action of negative pressure, and be guided to the waste collection area 3400 along the driving direction of the absorption belt 3332.

The foregoing descriptions are merely exemplary embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. A method for forming an electrode plate, wherein the electrode plate comprises a body portion and a plurality of tabs, the tabs protrude from the body portion at an edge of the body portion, and the method comprises:
    performing tab cutting on a substrate for multiple times, so that the substrate forms the body portion, an edge portion connecting to the body portion, and the plurality of tabs that are connected to the body portion but are separated from the edge portion; and
    performing an edge portion cutting on the substrate to separate the edge portion from the body portion;
    wherein in each tab cutting a group of cutting lines that separate one of the tabs from the edge portion are formed on the substrate, the group of cutting lines comprises a first cutting line and a second cutting line; and
    wherein a process of forming the group of cutting lines that separate one of the tabs from the edge portion comprises:
        cutting the substrate along a first side edge of the tab from a position of a first root of the tab to a first position beyond a widthwise edge of the substrate, to form the first cutting line; and
        cutting the substrate along a second side edge of the tab from a second position beyond a widthwise edge of the substrate to the position of a second root of the tab, to form the second cutting line.

2. The method according to claim 1, wherein performing the tab cutting on the substrate multiple times comprises:
    performing cutting on the substrate multiple times in the process of transferring the substrate in a first direction, wherein the group of cutting lines that separate one of the tabs from the edge portion are formed on the substrate in each cutting.

3. The method according to claim 2, wherein performing cutting on the substrate multiple times in the process of transferring the substrate in the first direction comprises:
    in the process of transferring the substrate in the first direction, performing cutting on the substrate multiple times through reciprocation of a cutting apparatus in a second direction,
    wherein the first direction intersects with the second direction.

4. The method according to claim 1, wherein each group of cutting lines further comprise a third cutting line, a fourth cutting line, and a fifth cutting line, and the third cutting line and the fifth cutting line each are connected to two ends of the fourth cutting line; and
    that the group of cutting lines that separate one of the tabs from the edge portion are formed on the substrate in each cutting comprises:
    the substrate is cut along the first side edge of the tab from the first root of the tab to a top edge of the tab to form the third cutting line;
    the substrate is cut along the top edge of the tab to form the fourth cutting line; and
    the substrate is cut along the second side edge of the tab from the top edge of the tab to the second root of the tab to form the fifth cutting line; wherein
    the third cutting line, the fourth cutting line, and the fifth cutting line together separate one of the tabs from the edge portion.

5. The method according to claim 1, wherein in each of two adjacent tabs, a first root of a first tab and a second root of a second tab are adjacent to each other; and
    the performing the edge portion cutting on the substrate to separate the edge portion from the body portion comprises:

performing a cutting on the substrate along a connection line between the first root of the first tab and the second root of the second tab to separate the edge portion from the body portion.

6. The method according to claim 1, further comprising:
performing a first negative-pressure dust removal when performing the tab cutting on the substrate; and
performing a second negative-pressure dust removal when performing the edge portion cutting on the substrate; wherein
a negative pressure in the first negative-pressure dust removal is less than or equal to a negative pressure in the second negative-pressure dust removal.

* * * * *